United States Patent
Prabhakar et al.

(10) Patent No.: US 11,650,043 B2
(45) Date of Patent: May 16, 2023

(54) NON-CONTACT PROCESS FOR ENGINE DEPOSIT LAYER MEASUREMENT

(71) Applicant: EXXONMOBIL TECHNOLOGY AND ENGINEERING COMPANY, Annandale, NJ (US)

(72) Inventors: Bhaskar Prabhakar, Houston, TX (US); Riccardo Conti, Medford, NJ (US)

(73) Assignee: Exxonmobil Technology and Engineering Company, Annandale, NJ (US)

(*) Notice: Subject to any disclaimer, the term of this patent is extended or adjusted under 35 U.S.C. 154(b) by 363 days.

(21) Appl. No.: 16/948,139

(22) Filed: Sep. 4, 2020

(65) Prior Publication Data

US 2021/0088324 A1   Mar. 25, 2021

Related U.S. Application Data

(60) Provisional application No. 62/905,744, filed on Sep. 25, 2019.

(51) Int. Cl.
  *G01B 11/06* (2006.01)
  *G01M 15/05* (2006.01)
  *G01N 21/956* (2006.01)
  *G01B 11/30* (2006.01)

(52) U.S. Cl.
  CPC ........ *G01B 11/0625* (2013.01); *G01B 11/303* (2013.01); *G01M 15/05* (2013.01); *G01N 21/95607* (2013.01)

(58) Field of Classification Search
  CPC ............ G01N 21/94; G01N 21/95607; G01M 15/042; G01M 15/05; G01B 11/0625; G01B 11/0633; G01B 11/303
  See application file for complete search history.

(56) References Cited

U.S. PATENT DOCUMENTS

| | | | | |
|---|---|---|---|---|
| 5,125,745 A | * | 6/1992 | Neiheisel | F27D 21/0021 |
| | | | | 356/627 |
| 9,957,887 B2 | * | 5/2018 | Roe | F02B 77/04 |
| 2010/0252546 A1 | * | 10/2010 | Herden | G01M 15/10 |
| | | | | 219/205 |

FOREIGN PATENT DOCUMENTS

| | | | | |
|---|---|---|---|---|
| CN | 110159428 A | * | 8/2019 | |
| CN | 209280314 U | * | 8/2019 | |
| CS | 225642 B1 | * | 2/1984 | |

* cited by examiner

*Primary Examiner* — Dominic J Bologna
*Assistant Examiner* — Amanda Merlino
(74) *Attorney, Agent, or Firm* — Vorys, Sater, Seymour and Pease LLP

(57) ABSTRACT

Systems and processes are provided for measuring carbon deposits on an engine. In some examples, a light source can be transmitted through a viewing window of an engine onto an area of an internal surface of the engine and reflected back through the viewing window and detected using an optical sensor. A topography of the area can be determined based, at least in part, on the reflected light source detected by the optical sensor and used to determine whether carbon deposits have increased, decreased, or remained constant on the area.

20 Claims, 1 Drawing Sheet

NON-CONTACT PROCESS FOR ENGINE DEPOSIT LAYER MEASUREMENT

CROSS-REFERENCE TO RELATED APPLICATIONS

This application claims the benefit of U.S. Provisional Application No. 62/905,744, filed on Sep. 25, 2019, the entire contents of which is incorporated herein by reference.

FIELD OF THE INVENTION

Embodiments disclosed herein relate to processes for measuring a thickness of engine deposits. More particularly, such embodiments relate to non-contact processes for measuring carbon-based deposits on marine internal combustion engine pistons.

BACKGROUND OF THE INVENTION

An inherent problem with internal combustion engines, when burning hydrocarbon-based fuels, is the formation and accumulation of carbon-based deposits (soot+hydrocarbon) on internal surfaces such as pistons, grooves, rings, and valves, etc. These deposits, under conditions of high pressure and temperature, tend to grow and harden over time, which can be detrimental to the performance of the engine. For example, fuel varnish deposits that form inside injectors can restrict fuel delivery and cause the engine to run lean. Intake valve deposits can restrict air flow through ports, reducing engine power output. Piston deposits can alter the compression ratio, which increase the risk of hotspots inside the engine that may result in pre-ignition of the fuel. Soft deposits can flake off and lodge between valves and seats, which can result in a loss of compression and engine misfires. Hard deposits can increase component wear inside the engine and accelerate oil consumption. Studying the accumulation rates (and thickness) of these deposits is of particular interest especially for fuel and lubricant manufacturers in order tailor the fuel and/or lubricant formulations to mitigate deposit formation and improve the longevity of the engine.

Current industry approved procedures require removing the components like pistons, valves, etc. from an engine and placing them on a measurement table (with some being able to rotate the components to provide a 360-degree measurement), typically under a laboratory setting with controlled conditions of lighting and temperature. Additionally, many of the techniques require the use of a contact probe to evaluate build-up at different points on the surface, to stitch them all together to measure a thickness profile. Such techniques are cumbersome, expensive, time consuming and requires a skilled operator to perform the measurements.

There remains a need, therefore, for improved non-contact processes for measuring carbon-based deposits on internal combustion engine surfaces.

SUMMARY

In some examples, a process for measuring carbon deposits is provided. The process can include transmitting a light source at a first point in time through a viewing window of an engine onto an area of an internal surface of the engine. The light source can reflect off the area back through the viewing window and can be detected using an optical sensor. A first topography of the area can be determined, at least in part, on the reflected light source detected by the optical sensor. The light source can be transmitted at a second point in time through the viewing window onto the area where the second point in time is after the first point in time. The light source can reflect off the area back through the viewing window and can be detected using an optical sensor. A second topography of the area can be determined based, at least in part, on the reflected light source detected by the optical sensor. The first topography and the second topography can be compared to determine whether carbon deposits have increased, decreased, or remained constant on the area.

Optionally, the process can include transmitting a light source at a first point in time through a scavenger port of an engine onto an area of a surface of a piston. The light source can reflect off the area back through the viewing window and can be detected using an optical sensor. A first topography of the area can be determined, at least in part, on the reflected light source detected by the optical sensor. The light source can be transmitted at a second point in time through the viewing window onto the area where the second point in time is after the first point in time. The light source can reflect off the area back through the viewing window and can be detected using an optical sensor. A second topography of the area can be determined based, at least in part, on the reflected light source detected by the optical sensor. The first topography and the second topography can be compared to determine whether carbon deposits have increased, decreased, or remained constant on the area.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
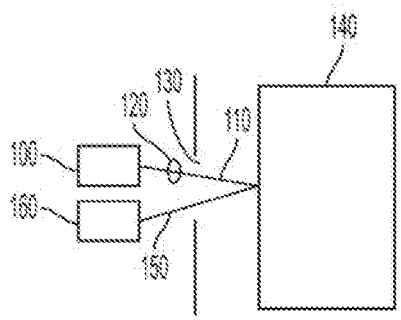
FIG. 1 shows an elevated view of an embodiment of a non-contact engine deposit layer measurement system.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or to configurations discussed in the Figures. Moreover, the exemplary embodiments presented below can be combined in any combination of ways, i.e., any element from one exemplary embodiment can be used in any other exemplary embodiment, without departing from the scope of the disclosure.

One of the challenges for measuring carbon deposits on the surface of engine parts is that most measurement techniques require the engine to be dismantled prior to taking any measurements. It has been surprisingly and unexpectedly discovered that by using a viewing window in an internal combustion engine, carbon deposits can be measured on the surface of engine part(s) without removing the engine parts by reflecting a light source off the surface of the engine part(s) and using data from the captured reflection to calculate carbon deposit thickness across the surface. More particularly, it has been surprisingly and unexpectedly discovered that a scavenge port in a marine engine can provide the access necessary to measure the carbon deposits on the surface of the piston in a two-stroke engine.

Additionally, by taking multiple measurements over a period of time, the rate of accumulation of carbon deposits can be measured. Further, multiple parameters (oil properties, temperatures, pressures) can be measured or manipulated to determine their effect on the rate of accumulation of carbon deposits. This data can be used to optimize engine life, avoid engine failures, schedule maintenance, determine optimal oil properties, and/or develop new engine fluid products.

As shown in FIG. 1, carbon deposits on the interior surfaces of an engine can be measured using the triangulation principle. The basic principle of triangulation involves a light source 100, which can be a laser, generating a small focused light beam 110. The light beam 110 can pass through a converging lens 120 and can also pass through a viewing window 130 before projecting the beam 110 on the area of the engine surface 140 to be measured. The beam 110 can be reflected from this point back through the viewing window 130 and the reflected beam 150 can be projected onto an optical sensor 160. In some examples, the optical sensor 160 can be a photosensor, a charge coupled device, or a complementary metal oxide semiconductor.

If the surface changes position with respect to the optical sensor 160, the movement of the reflected beam 150 can be projected on a different part of the optical sensor 160 and can be analyzed to output the exact position of the surface. Moving the light beam 110 across an area of the engine surface 140 and detecting the reflected beam with the optical sensor 150 can allow a topography of the surface to be produced using, at least in part, data derived from the reflected beam 150 by the optical sensor 160. The light source 100 can move along the x and y axis so that the scan of the entire area can be obtained. The light source can be connected to a stepper motor with a step size of less than 1 mm, less than 0.01 mm, less than 0.001 mm, or less than 0.0001 mm. By taking these measurement at different points in time, the topographies can be compared to determine whether the carbon deposits have increased, decreased, or remained the same. Additionally, the rate of change of the carbon deposits can be determined.

In some examples, the area of the surface being analyzed can be greater than 1 $mm^2$, greater than 10 $mm^2$, greater than 50 $mm^2$, greater than 100 $mm^2$, or greater than 1000 $mm^2$. In some examples, the area of the surface being analyzed can be from about 1 $mm^2$ to about 10.000 $mm^2$, about 100 $mm^2$ to about 10,000 $mm^2$, about 500 $mm^2$ to about 10,000 $mm^2$, about 100 $mm^2$ to about 5,000 $mm^2$, about 1 $mm^2$ to about 1,000 $mm^2$, about 100 $mm^2$ to about 1,000 $mm^2$, or about 500 $mm^2$ to about 1,000 $mm^2$.

In some examples, the distance between the light source 100 and the area of the engine surface 140 can be substantially the same at the different points in time when the area is being analyzed. If the area of the engine surface 140 being analyzed is in a different relative position to the light source 100, the calculations to determine the topography of the area become significantly more complicated. In some examples, when the area is being analyzed at different points in time, the distance from the light source to the center of the area being analyzed between successive measurements can change by less than 1 mm, less than 0.1 mm, less than 0.01 mm, less than 0.001 mm, or less than 0.0001 mm. When the engine surface being analyzed is a moving engine part, like a piston, the engine part can be moved into a specific position (e.g. top dead center) such that the engine part can be in the same position when the engine surface is being analyzed. In some examples, the light source 100 can be removably or fixably attached to a location such that the light source 100 can be in in the same position relative to the engine when the engine surface is being analyzed.

To increase the accuracy of the measurement, a focused light beam can be used. The diameter of the spot being generated at the focal point of light beam 110 on the surface of the engine part can be less than 5 mm, less than 1 mm, less than 0.5 mm, less than 0.1 mm, less than 0.01 mm, or less than 0.001.

In some examples, the light source 100 can be a laser having a wavelength of 100 nm to 1 mm, 300 nm to 700 nm, or 300 nm to 500 nm. In some examples, a red laser generating a light beam having a wavelength of about 620 to about 690 nm can be used. In some examples, a blue laser generating a light beam having a wavelength of about 360 to 480 nm can be used. A blue laser works at a shorter wavelength of 360 to 480 nm, which is far from the red part of the visible spectrum. The blue laser is therefore unaffected by the emitted light, which can be blocked from entering the optical sensor by using a simple optical filter, ensuring very stable signals. Additionally, the blue light has six times more energy than the red light, which can make the blue light easier to detect. The shorter wavelength of the blue light also can improve spot image integrity for better accuracy.

In some examples, the viewing window 130 can be an opening that allows the light source 100 to pass through. The viewing window 130 can be different shapes including rectangular, square, oval, round, triangular, or other geometric shapes. The viewing window 130 can have an open and a closed position. The viewing window 130 can be in the open position when the light source passes through the viewing window. In some examples, the viewing window 130 can be a scavenge port. A scavenge port can provide access to the internal surfaces of an engine, including the pistons. The scavenge port can be part of a two-stroke, including a two-stroke marine engine.

In some examples, the data from the optical sensor 160 can be sent to a processor. The processor can include a diagnostic and analysis system. The processor can execute instructions to generate and/or operate a model to provide advanced analytics functions.

The diagnostic and analysis system can include a model that can build interrelationships between carbon deposit thickness or rate of change of the carbon deposits and other conditions or engine properties that are monitored using sensors or other standard monitoring techniques during the operation of the engine. These other conditions or engine properties can include oil properties, such as oil viscosity, oil temperature, metal content of the oil, oil formulation, and engine properties, such as temperature, $NO_x$ emissions, combustion conditions, and fuel formulation. After the model is established, values of any number of these parameters may be provided to the model to generate values of other parameters to model different conditions and to optimize the system.

The model can include any appropriate type of mathematical or physical model indicating interrelationships between the parameters. For example, the model can be a neural network based mathematical model that is trained to capture interrelationships between the parameters. Other types of mathematic models, such as fuzzy logic models, linear system models, and/or non-linear system models, etc., can also be used.

In some examples, the model can be used to optimize engine life, avoid engine failures, schedule maintenance, determine optimal oil properties, determine optimal fuel properties, or develop new engine fluid products, including engine oils and engine fuels.

EXAMPLES

The foregoing discussion can be further described with reference to the following non-limiting examples.

Example 1

Figure 2:
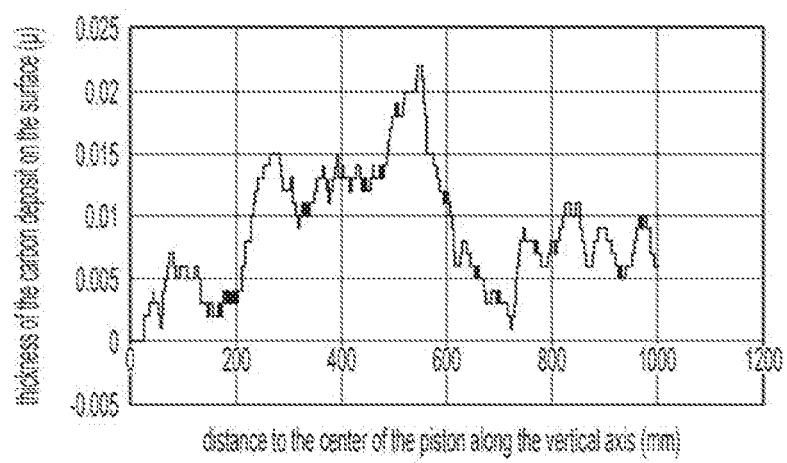
FIG. 2 depicts a graph of the thickness of the carbon deposit on the surface of the piston as a function of the distance to the center of the piston along the vertical axis.

A piston from a diesel engine was removed and placed on a table 80 mm from a Keyence model No. LJV7000 profiler that was attached to a stepper motor. The Keyence profiler reflected a 405 nm blue laser off the surface of the piston and captured the reflected laser with an internal optical sensor. Data from the Keyence profiler was sent to a processing unit to determine the topography of the surface of the piston shown in FIG. 2.

Embodiment 1. A process, comprising: transmitting a light source at a first point in time through a viewing window of an engine onto an area of an internal surface of the engine; reflecting the light source off the area back through the viewing window; detecting the reflected light source using an optical sensor; determining a first topography of the area based, at least in part, on the reflected light source detected by the optical sensor; transmitting the light source at a second point in time through the viewing window onto the area wherein the second point in time is after the first point in time; reflecting the light source off the area back through the viewing window; detecting the reflected light source using an optical sensor; determining a second topography of the area based, at least in part, on the reflected light source detected by the optical sensor; and comparing the first topography and the second topography to determine whether carbon deposits have increased, decreased, or remained constant on the area.

Embodiment 2. The process of Embodiment 1, wherein the viewing window is a scavenge port.

Embodiment 3. The process of Embodiment 1 or Embodiment 2, wherein the internal surface of the engine is a piston.

Embodiment 4. The process of any of Embodiments 1 to 3, wherein the light source is a blue laser.

Embodiment 5. The process of any of Embodiments 1 to 4, wherein the optical sensor is a photosensor.

Embodiment 6. The process of any of Embodiments 1 to 5, wherein the light source and the internal surface of the engine are substantially the same distance from each other at the first period in time and the second period in time.

Embodiment 7. The process of any of Embodiments 1 to 6, further comprising the step of determining a rate of change of the carbon deposits on the area.

Embodiment 8. The process of any of Embodiments 7, wherein the rate of change of the carbon deposits is used to select a different engine oil for the engine.

Embodiment 9. The process of any of Embodiments 1 to 8, wherein the rate of change of the carbon deposits is used to schedule maintenance on the engine.

Embodiment 10. The process of any of Embodiments 1 to 9, further comprising the step of measuring at least one engine property while the engine is operating between the first period in time and the second period in time to determine an effect of the engine property on the rate of change of the carbon deposits.

Embodiment 11. The process of Embodiment 10, wherein the engine property is an oil property, an engine temperature, or an engine pressure.

Embodiment 12. The process of any of Embodiments 1 to 11, wherein the light source is connected to a stepper motor to move the light source along both an x and y axis relative to the internal surface of the engine so that the light source can be transmitted across the entire area.

Embodiment 13. The process of any of Embodiments 1 to 12, wherein the area of the internal surface of the engine is greater than 100 mm$^2$.

Embodiment 14. A process, comprising: transmitting a light source at a first point in time through a scavenger port of an engine onto an area of a surface of a piston; reflecting the light source off the area back through the viewing window; detecting the reflected light source using an optical sensor; determining a first topography of the area based, at least in part, on the reflected light source detected by the optical sensor; transmitting the light source at a second point in time through the scavenger port onto the area wherein the second point in time is after the first point in time; reflecting the light source off the area back through the viewing window; detecting the reflected light source using an optical sensor; determining a second topography of the area based, at least in part, on the reflected light source detected by the optical sensor comparing the first topography and the second topography to determine whether carbon deposits have increased, decreased, or remained constant on the area.

Embodiment 15. The process of Embodiment 14, wherein the light source is a blue laser.

Embodiment 16. The process of any of Embodiment 14 or Embodiment 15, wherein the optical sensor is a photosensor.

Embodiment 17. The process of any of Embodiments 14 to 16, wherein the light source and the area of the internal surface of the piston are substantially the same distance from each other at the first period in time and the second period in time.

Embodiment 18. The process of any of Embodiments 14 to 17, wherein the piston is top dead center at the first period in time and the second period in time.

Embodiment 19. The process of any of Embodiments 14 to 18, further comprising the step of determining a rate of change of the carbon deposits on the area.

Embodiment 20. The process of Embodiment 19, wherein the rate of change of the carbon deposits is used to select a different engine oil for the engine.

Embodiment 21. The process of Embodiment 19 or Embodiment 20, wherein the rate of change of the carbon deposits is used to schedule maintenance on the engine.

Embodiment 22. The process of any of Embodiments 19 to 21, further comprising the step of measuring at least one engine property while the engine is operating between the first period in time and the second period in time to determine an effect of the engine property on the rate of change of the carbon deposits.

Embodiment 23. The process of Embodiment 22, wherein the engine property is an oil property, an engine temperature, or an engine pressure.

Embodiment 24. The process of any of Embodiments 14 to 23, wherein the light source is connected to a stepper motor to move the light source along both an x and y axis relative to the internal surface of the engine so that the light source can be transmitted across the entire area.

Embodiment 25. The process of any of Embodiments 14 to 24, wherein the area is greater than 100 mm$^2$.

Certain embodiments and features have been described using a set of numerical upper limits and a set of numerical lower limits. It should be appreciated that ranges including the combination of any two values. e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process, comprising:
    transmitting a light beam from a light source at a first point in time through a viewing window of an engine onto an area of an internal surface of the engine;
    reflecting the light beam off the area back through the viewing window, thereby producing a reflected light beam;
    detecting the reflected light beam using an optical sensor;
    determining a first topography of the area based, at least in part, on the reflected light beam detected by the optical sensor;
    transmitting a second light beam from the light source at a second point in time through the viewing window onto the area, wherein the second point in time is after the first point in time;
    reflecting the second light beam off the area back through the viewing window, thereby producing a second reflected light beam;
    detecting the second reflected light beam using the optical sensor;
    determining a second topography of the area based, at least in part, on the second reflected light beam detected by the optical sensor;
    comparing the first topography and the second topography to determine whether carbon deposits have increased, decreased, or remained constant on the area; and
    measuring at least one engine property while the engine is operating between the first point in time and the second point in time to determine an effect of the engine property on a rate of change of the carbon deposits, wherein the engine property is an oil property, an engine temperature, or an engine pressure.

2. The process of claim 1, wherein the viewing window is a scavenge port.

3. The process of claim 1, wherein the internal surface of the engine is a piston.

4. The process of claim 1, wherein the light source is a blue laser.

5. The process of claim 1, wherein the optical sensor is a photosensor.

6. The process of claim 1, wherein the light source and the internal surface of the engine are substantially the same distance from each other at the first point in time and the second point in time.

7. The process of claim 1, wherein the rate of change of the carbon deposits is used to select a different engine oil for the engine.

8. The process claim 1, wherein the rate of change of the carbon deposits is used to schedule maintenance on the engine.

9. The process of claim 1, wherein the light source is connected to a stepper motor to move the light source along both an x and y axis relative to the internal surface of the engine so that the light beams can be transmitted across the entire area.

10. The process of claim 1, wherein the area of the internal surface of the engine is greater than 100 mm$^2$.

11. The process of claim 1, wherein the oil property is selected from the group consisting of an oil viscosity, an oil temperature, a metal content of oil, an oil formulation, and any combination thereof.

12. The process of claim 1, wherein the engine property is selected from the group consisting of a temperature, a NOx emission, a combustion condition, a fuel formulation, and any combination thereof.

13. A process, comprising:
    transmitting a light beam from a light source at a first point in time through a viewing window of an engine onto an area of a surface of a piston;
    reflecting the light beam off the area back through the viewing window;
    detecting the reflected light beam using an optical sensor;
    determining a first topography of the area based, at least in part, on the reflected light beam detected by the optical sensor;
    transmitting a second light beam from the light source at a second point in time through the viewing window onto the area wherein the second point in time is after the first point in time;
    reflecting the second light beam off the area back through the viewing window;
    detecting the reflected second light beam using the optical sensor;
    determining a second topography of the area based, at least in part, on the reflected second light beam detected by the optical sensor;
    comparing the first topography and the second topography to determine whether carbon deposits have increased, decreased, or remained constant on the area; and
    measuring at least one engine property while the engine is operating between the first point in time and the second point in time to determine an effect of the engine property on a rate of change of the carbon deposits, wherein the engine property is an oil property, an engine temperature, or an engine pressure.

14. The process of claim 13, wherein the light source is a blue laser.

15. The process of claim 13, wherein the optical sensor is a photosensor.

16. The process of claim 13, wherein the light source and the area of the internal surface of the piston are substantially the same distance from each other at the first point in time and the second point in time.

17. The process of claim 13, wherein the piston is top dead center at the first point in time and the second point in time.

18. The process of claim 13, wherein the rate of change of the carbon deposits is used to select a different engine oil for the engine.

19. The process of claim 13, wherein the oil property is selected from the group consisting of an oil viscosity, an oil temperature, a metal content of oil, an oil formulation, and any combination thereof.

20. The process of claim 13, wherein the engine property is selected from the group consisting of a temperature, a NOx emission, a combustion condition, a fuel formulation, and any combination thereof.

\* \* \* \* \*